United States Patent
Psaras et al.

(10) Patent No.: US 7,337,429 B1
(45) Date of Patent: Feb. 26, 2008

(54) APPLICATION SYSTEM CERTIFICATION PROCESS

(75) Inventors: Nancy M. Psaras, Hopewell Junction, NY (US); Thomas J. Cleary, Roxbury, CT (US); George P. Ziegler, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 1387 days.

(21) Appl. No.: 09/724,628

(22) Filed: Nov. 28, 2000

(51) Int. Cl.
*G06F 9/44* (2006.01)

(52) U.S. Cl. .............. 717/101; 717/104; 717/126

(58) Field of Classification Search ........ 717/100, 717/101–103, 120–127, 134–135, 168–178, 717/104
See application file for complete search history.

(56) References Cited

U.S. PATENT DOCUMENTS

| | | | |
|---|---|---|---|
| 5,045,994 A | 9/1991 | Belfer et al. | 364/200 |
| 5,500,941 A | 3/1996 | Gil | 395/183.14 |
| 5,590,057 A | 12/1996 | Fletcher et al. | 364/551.01 |
| 5,678,044 A | 10/1997 | Pastilha et al. | 395/615 |
| 5,742,823 A * | 4/1998 | Edwards et al. | 718/102 |
| 5,864,620 A | 1/1999 | Pettitt | 380/4 |
| 6,105,137 A | 8/2000 | Graunke et al. | 713/201 |
| 6,167,568 A | 12/2000 | Gandel et al. | 717/11 |
| 6,405,364 B1 * | 6/2002 | Bowman-Amuah | 717/101 |
| 6,662,357 B1 | 12/2003 | Bowman-Amuah | 717/120 |
| 6,725,399 B1 * | 4/2004 | Bowman | 717/124 |
| 2001/0052108 A1 * | 12/2001 | Bowman-Amuah | 717/1 |
| 2003/0051236 A1 * | 3/2003 | Pace et al. | 717/177 |

FOREIGN PATENT DOCUMENTS

| | | |
|---|---|---|
| EP | 989713 | 3/2000 |
| EP | 997807 | 5/2000 |
| JP | 11025053 | 1/1999 |
| WO | 9834365 | 8/1998 |
| WO | 0010283 | 2/2000 |

OTHER PUBLICATIONS

H. Sassenburg, "How to Sustain (S) PI? Assessing Readiness for (Software) Process Improvement," SPI 95 European Conference on Software Process Improvement, Barcelona, Spain, Dec. 1995. (Abstract Only).

* cited by examiner

*Primary Examiner*—Kakali Chaki
*Assistant Examiner*—William H. Wood
(74) *Attorney, Agent, or Firm*—John Pivnichny

(57) ABSTRACT

A software application is certified prior to deployment. A reviewer is assigned and a review time scheduled. A readiness assessment is performed prior to the review time. The reviewer then conducts a review including an overview, process flows identifying control points, deliverables, a demonstration, and a test plan. Results of the review are reported and a determination made of whether to certify the application. The software application may also be certified including performing additional testing after deployment.

1 Claim, 2 Drawing Sheets

APPLICATION SYSTEM CERTIFICATION PROCESS

TECHNICAL FIELD

The invention relates generally to a process for certifying a software application and more particularly to a process for certifying a software application prior to its deployment.

BACKGROUND OF THE INVENTION

When a new software application is to be deployed in an organization it is essential that the application conform to the business environment of the organization. This is particularly critical when the software application supports one or more business processes of the organization and therefore must include various checks and steps needed to provide results for proper business controls as well as operate reliably with high quality.

Techniques and processes as described below have been developed for addressing this problem, primarily directed to the software quality and reliability requirement. However, no satisfactory solution has heretofore been found which addresses the business control and software quality concerns. Post installation audits in particular by their very nature are applied after an application is operational and therefore are not effective during a pre-installation certification.

Belfer et al. in U.S. Pat. No. 5,045,994 describe a method of testing application software using an emulation environment. A user can call sequences of input-output screen pairs used to submit and receive information to/from the application. The screens are prepared offline. An input screen has actual input information for the application. A corresponding output screen has the expected results. The expected results are compared to the actual results received after running the application using the input information in the input screen.

Gil describes in U.S. Pat. No. 5,500,941 a method of performing software validation testing on large electronic systems to determine the quality of the software within the large system. A plurality of stimuli are defined to cause the software to transition from one state to another. The responses to the stimuli are identified and the probabilities of occurrence of the state transitions are calculated. A usage model is built from a plurality of usage cases, where each usage case is identified as comprising a set of state transitions. The probability of occurrence of each usage case is also calculated. A usage profile is built listing the usage cases in order of descending probability. An automated test program is compiled from the usage profile, the stimuli, and the responses. The test program is then executed on the software system to analyze and report the software quality.

H. Sassenburg in a paper entitled "How to sustain (S) PI? assessing readiness for (software) process improvement," presented at the SPI 95 European Conference on Software Process Improvement, Barcelona Spain, December 1995 states in the abstract that the Capability Maturity Model has led to software process improvement programs. However, most such programs are quietly terminated. A checklist for determining where weak points exist in the program can be used to increase the probability of the program succeeding.

European patent EP989713 describes a use for certified software. EP997807 describes a method of certifying transmission of software. Japanese patent JP11025053A determines the certification of a person through use of an IC card. PCT patent WO9834365 describes a method of distributing certified software. PCT patent WO 200010283 describes a method of controlling access to video and audio content by determining whether the BIOS and operating system is certified for access.

All of the above described patents are incorporated herein by reference.

Despite these developments a satisfactory process for certifying software applications to be deployed in a business is still needed.

Therefore, in accordance with the teachings of the present invention there is provided an improved process for certifying software applications prior to their deployment in a business. It is believed that such a process would constitute a significant advancement in the art.

OBJECTS AND SUMMARY OF THE INVENTION

It is therefore a principal object of the present invention to enhance the software certification art by providing a process with enhanced capabilities.

It is another object to provide such a process wherein enhanced operational capabilities are provided.

These and other objects are attained in accordance with one embodiment of the invention wherein there is provided a process for certifying a software application prior to deployment, comprising the steps of, entering a review request for a software application into a staging database, assigning a reviewer and scheduling a time for the review, performing a readiness assessment prior to the time for the review, conducting the review by the reviewer including providing an overview and process flows identifying control points, providing deliverables, and providing a test plan, reporting results of the review, and determining whether the results justify a decision of certification of the software application.

In accordance with another embodiment of the invention there is provided a process for certifying a software application, comprising the steps of, entering a review request for a software application into a staging database, assigning a reviewer and scheduling a time for the review, performing a readiness assessment prior to the time for the review, conducting the review by the reviewer including providing an overview and process flows identifying control points, providing deliverables, and providing a test plan, reporting results of the review, determining whether the results justify a decision of certification of the software application, and if so, deploying the software application, and executing at least a part of the test plan.

BEST MODE FOR CARRYING OUT THE INVENTION

For a better understanding of the present invention, together with other and further objects, advantages, and capabilities thereof, reference is made to the following disclosure and the appended claims in connection with the above-described drawings.

Figure 1:
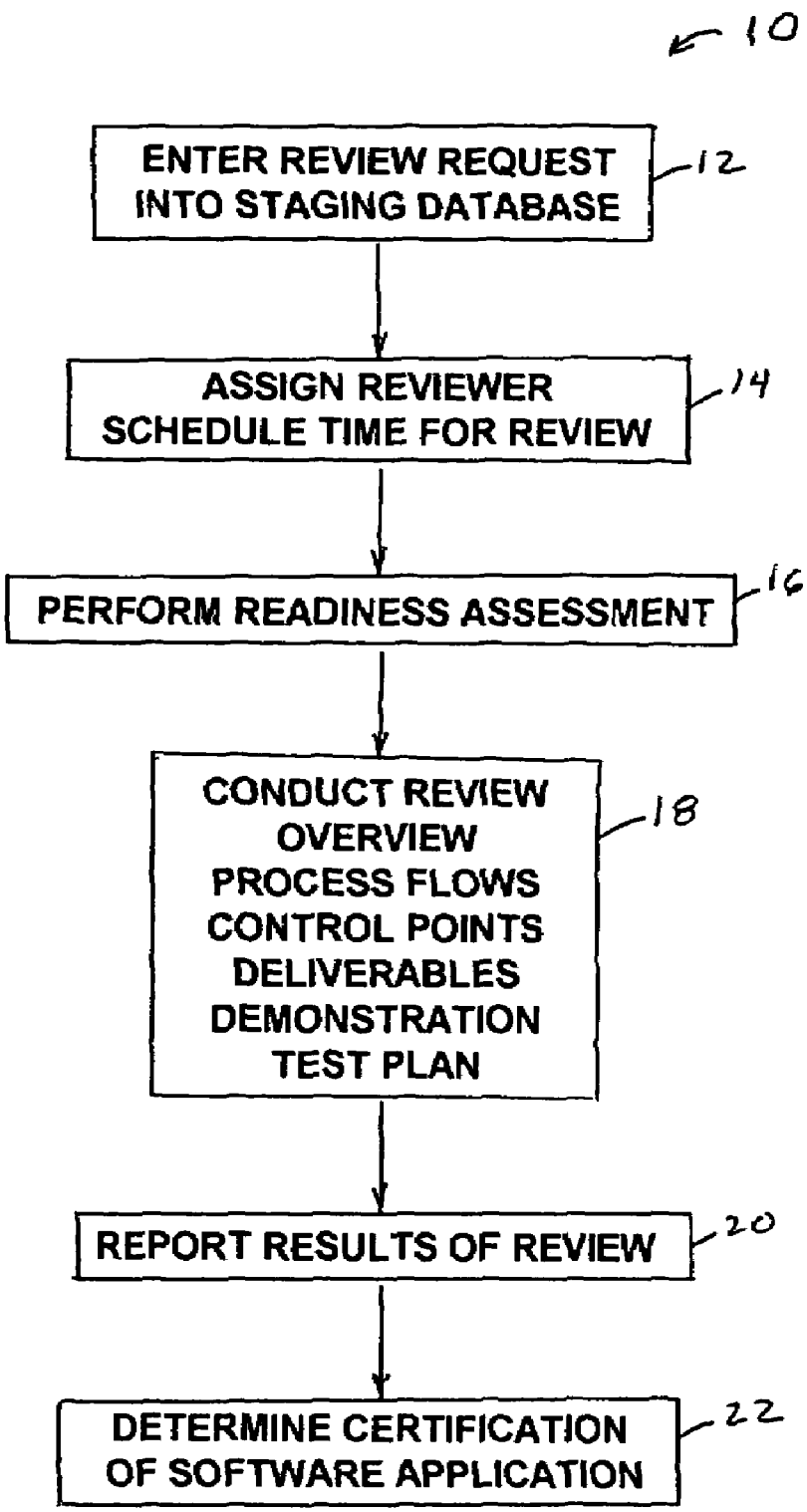
FIG. 1 is a flowchart of a process for certifying a software application in accordance with the present invention.

In FIG. 1 there is shown a flowchart 10 of a process for certifying a software application in accordance with the present invention. The software application may be any type of software application including for example a spreadsheet application. Certification may be particularly important if the spreadsheet application performs functions which are financially sensitive including a direct feed into a second certified software application. In such an arrangement the first software application is referred to as a trusted source for the second application.

The software application may also be a common application where a function is developed for use at multiple locations. All locations adhere to a central process, however, each installation may implement different controls, procedures, local interfaces, and operate in a different local environment. Certification of common applications must therefore also focus on these differences including any base code modification or differing use of program exits.

The software application may also be purchased from a vendor. Regardless of how acquired, such applications must comply with the certification standards of internally developed applications. In some cases the certification may be performed prior to the decision to purchase the application, for example through certification using a copy of the application obtained on a trial basis.

Some software applications, whether purchased or internally developed, are widely used throughout a company including deployment in multiple geographies. Such applications are referred to as enterprise wide systems. Certification of the initial installation may form a base from which further certification can be performed on further geography deployments as they occur, with focus on the geographical differences.

In step 12 a review request for a software application is entered into a staging database. The staging database may be any type of database including but not limited to a relational database, sequential database, or spreadsheet database. The request may provide application detail and complexity factors. It may also provide date, duration, contact and review location details.

In step 14 a reviewer is assigned to the review and a time is scheduled for the reviews. The reviewer and person entering the request may be automatically, by e-mail or other means, or manually notified of the scheduled time and location for the review. Steps 12 and 14 may be performed using an automated function to enter the review request into the staging database, assign the reviewer, schedule the time, and notify the reviewer and person entering the request. The automated function also assists in tracking review status, date changes, and assignments.

Prior to the review a readiness assessment is performed in step 16. The readiness assessment may also be automated. A checklist of questions may be used as a way to perform such an assessment. For example the list of questions shown below in Table 1 may be used. A sensitive program is taken to mean any program that creates a hardcopy negotiable document such as a check.

TABLE 1

Readiness Assessment

1. Has a business process owner been identified?
2. Has all applicable testing been completed? (e.g. regression, system, function, user acceptance, cycle, unit)
3. Have all service level agreements and documents of understanding been identified and approved?
4. Have data flow diagrams/charts been completed and control points identified?

TABLE 1-continued

Readiness Assessment

5. Have separation of duties assessments been completed and associated documentation created? (e.g. matrix, job responsibilities, application system access)
6. Has the application system been assessed for identification of sensitive programs?
7. Have all control procedures been identified and documented? (e.g. system management control, desk procedures, disaster recovery, table maintenance, fallback)
8. Is there compliance with all applicable corporate instructions and standards?
9. Is the service provider in compliance with all applicable corporate instructions, standards, and guidelines.
10. Has an education plan been developed and implemented?
11. Have all data migration and/or data conversion plans been defined and documented?
12. Have all risks been documented and accepted?
13. Have all downstream applications been approved?
14. Have all upstream software applications used as a trusted source been certified?

The person entering the review request in step 12 would normally be asked to complete a checklist by answering the questions and thereby perform the readiness assessment in step 16. Other types of readiness assessment known in the art may also be performed without departing from the scope of the invention.

In step 18 a review is conducted by the reviewer assigned in step 14 or his designee(s). The review may take many forms such as a written document, presentation, or description, but includes providing an overview of the software application and process flows identifying control points. The overview comprises an application environmental overview which is taken to mean a high level business process overview that describes the function performed within a business unit. The application environmental overview also describes how the software application fits within the business environment. The overview also comprises an architectural overview including a description of the functional requirements, data requirements, control and auditability requirements, platform security, and system requirements. The architectural overview also identifies the upstream and downstream interfaces and key dependencies within the software application. The architectural overview also describes how the application works, what are the data input/output dependencies, what are the application's interrelationships, and what are the platform security requirements.

Process flows may be provided as flowcharts identifying the position of automated or manual control points within the software application. Each control point includes text describing how the control point works and actions to be taken for both normal and exception control outcome. The flowcharts demonstrate that the software application is controlled, data integrity and accuracy is maintained, and fraud can be prevented or detected. The text accompanying a control point may describe reconciliation and balancing controls; system interface/bridge administration and error recovery; process, system, or application error recovery; authorization/verification controls; and master table maintenance controls.

The review may also include a separation of duties evaluation to determine conflicting (non-permitted) tasks. A task can be application access, system activities/transactions, or job responsibilities. A matrix can be used to evaluate and demonstrate the non-permitted tasks. The matrix lists tasks for each row e.g. down the left side, and the same tasks for each column e.g. across the top. An X or other symbol in a matrix cell indicates that the two tasks identified by the row and column containing the cell with the X are a conflict and must be performed by different people. The reviewer verifies that all the pairs of tasks having an X will indeed be separated when the application is deployed.

The review may also include an evaluation of control points that prevent unauthorized change or access to the software application. Changes can include changes to programs, tables, configuration, authorization, or profiles.

The review may also include evaluation of an asset protection plan identifying control points that ensure all data has been properly identified, classified, and protected.

A test plan is provided as part of the review. The test plan describes the criteria (breadth and depth) for successful test completion in all test phases such as regression, function and system test. The test plan defines the minimum criteria that must be met before acceptance of the software application. It also describes test scenarios and expected results for all control points. The test plan may include tests to be performed after deployment of the software application.

Test execution results are one of the deliverables provided in the review. Actual testing results (both negative and positive) are compared to the expected results. The test execution results also include a statement identifying who performed the test and when it was performed.

Deliverables of step 18 comprise all of the items produced during the review as described above.

A demonstration may optionally be provided. The demonstration is a live simulation of the application showing the end-to-end processing steps. The demonstration may include live on-line testing. A sample test involving incorrect input data or an illogical function request may be run during the demonstration to verify proper handling of such data or requests.

The results of the review are reported in step 20. Results include but are not limited to test execution results, process flowcharts and any statements expressed by the reviewer regarding the evaluations described above. Various on-line or automated tools may be used to report the results and to permit on-line review of the results.

In step 22, it is determined whether the results justify certification of the software application. The reviewer would normally make this determination based on the results, however other methods of determination such as group consensus or management signoff may be used.

Figure 2:
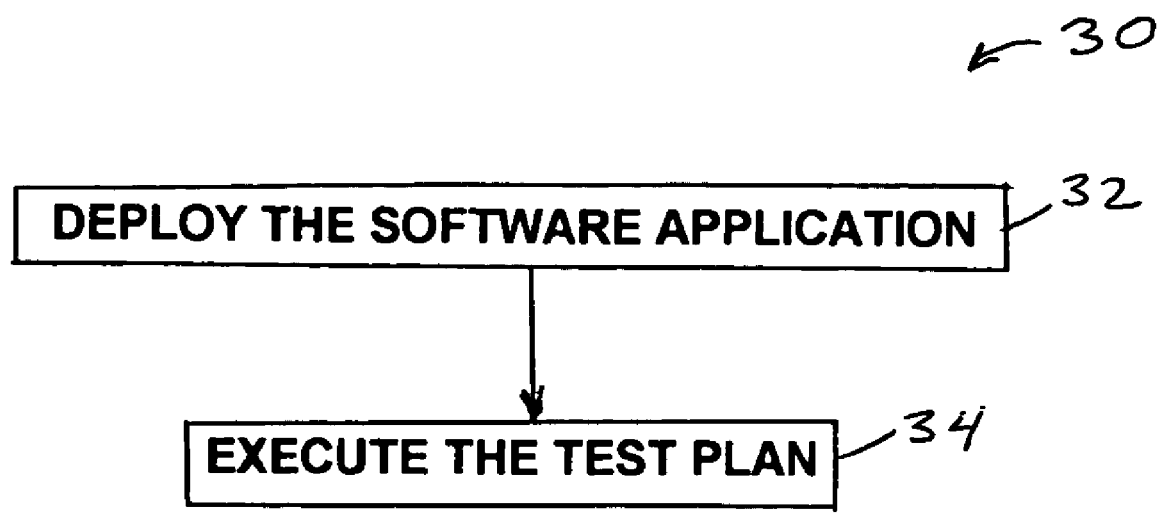
FIG. 2 is a flowchart showing additional steps for certifying a software application in accordance with another embodiment of the invention.

In FIG. 2 there is shown an additional flowchart 30 describing additional steps performed in another embodiment of the present invention. After step 22 of FIG. 1, the software application is deployed in step 32. Deployment is taken to mean installation, activation, and use in a production manner. In step 34, the post deployment portion of the test plan of step 18 is executed. A post audit of the execution test results is performed.

A quality assurance survey may be sent automatically or manually to the person who entered the request in step 12. The survey may be an automated function. Survey results are then used to improve the quality of the certification process of the present invention.

While there have been shown and described what are at present considered the preferred embodiments of the invention, it will be obvious to those skilled in the art that various changes and modifications may be made therein without departing from the scope of the invention as defined by the appended claims. For example, the steps of flowchart 10 may be fully or partly embodied in a computer program product.

What is claimed is:

1. A computerized process for certifying a software application obtained on a trial basis prior to deployment in an organization, comprising the steps of:

entering a review request for certification of a software application obtained on a trial basis prior to deployment in an organization, into a staging database;

by executing an automated function, assigning a reviewer and scheduling a time for said review, in response to said entering said review request in said staging database;

automatically performing a readiness assessment prior to said time for said review including identifying a business process owner and assessing said software application for sensitive programs which create a hard copy negotiable document;

conducting said review by said reviewer including providing an overview of process flows identifying control points, providing deliverables including executing regression, function, and system tests of said software application and providing actual execution results of said tests and providing a certification test plan;

by executing an automated function conducting a separation of duties evaluation of said software application by constructing a matrix to determine conflicting tasks and verifying that tasks in conflict are performed by different people;

reporting results using on-line tools, of said review; and determining based on an on-line review of said results, whether said results justify a decision of certification of said software application.

* * * * *